Sept. 16, 1969     P. H. SMITH     3,467,804
DETECTION APPARATUS

Filed Jan. 3, 1967     2 Sheets-Sheet 1

INVENTOR
*PETER H. SMITH*
BY *PENDLETON, NEUMAN SEIBOLD & WILLIAMS*
ATTORNEYS

Sept. 16, 1969   P. H. SMITH   3,467,804
DETECTION APPARATUS
Filed Jan. 3, 1967   2 Sheets-Sheet 2

INVENTOR
PETER H. SMITH
BY PENDLETON, NEUMAN
SEIBOLD & WILLIAMS
ATTORNEYS

United States Patent Office 3,467,804
Patented Sept. 16, 1969

3,467,804
DETECTION APPARATUS
Peter Harold Smith, Maidenhead, England, assignor to Microtherm Limited, London, England
Filed Jan. 3, 1967, Ser. No. 606,898
Claims priority, application Great Britain, Jan. 3, 1966, 48/66
Int. Cl. H05b 9/06; G08b 13/16
U.S. Cl. 219—10.55  7 Claims

ABSTRACT OF THE DISCLOSURE

The detection apparatus disclosed exemplarily is sensitive to physical conditions prevailing in the cavity of a microwave oven. The apparatus comprises an oscillator including as a regenerative feed-back loop an acoustic transmitter and receiver coupled acoustically through the cavity so that the amplitude or frequency of oscillation is sensitive for instance to the presence of steam, or an article in the cavity and to the opening of a door to the cavity.

---

This invention relates to apparatus for detecting changes in the physical conditions in a chamber. The invention is particularly applicable to electronic ovens, for instance for monitoring the presence of an article to be heated in the oven chamber, but has other applications.

Arrangements are known for detecting the presence of an article in a cavity which rely on the displacement of the actuating arm of a microswitch by the weight of the body. Such arrangements have not proved wholly satisfactory, partly because the article must be supported in a displaceable manner in the cavity. An arrangement of this kind is disclosed in our application Ser. No. 293,688, filed July 9, 1963, now Patent No. 3,300,615.

The invention provides an arrangement which is acoustically sensitive to the physical conditions in a chamber such as the presence of an article. The apparatus of the invention can also be used to monitor other physical conditions in the chamber, such as the temperature of an article therein, as indicated by the amount of steam released by the article, and a door to the chamber is open or closed. The detection apparatus of the invention comprises an oscillator having a regenerative feed-back path which includes an acoustic transmitter and receiver coupled together acoustically through the chamber. The acoustic characteristics of the chamber control, the output of the oscillator, for instance by controlling its frequency or amplitude.

Other features and advantages of the invention will appear from the following description of embodiments thereof given by way of example with reference to the accompanying drawings, in which.

Figure 1:
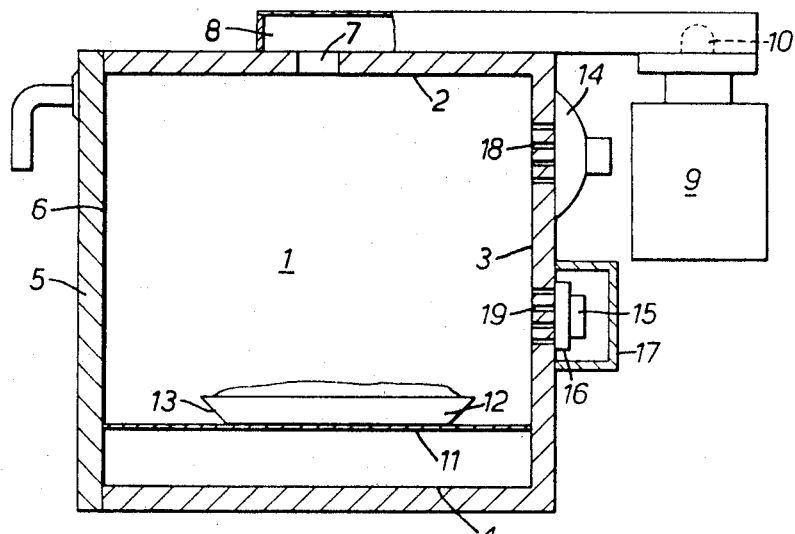
FIGURE 1 is a schematic sectional view of a microwave oven which incorporates detection apparatus for monitoring the presence of an article to be heated.

The ovens illustrated in the drawings have an oven chamber for receiving articles to be heated, such as articles of food, and an acoustic detection device for monitoring the oven chamber.

Figure 2:
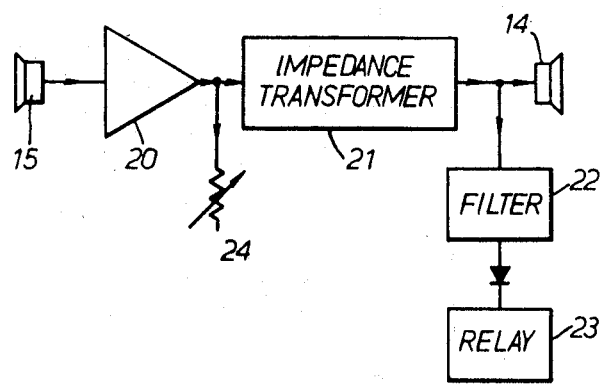
FIGURE 2 is a diagram of the detection apparatus used with the oven of FIGURE 1.

Referring first to FIGURES 1 and 2, the microwave oven of this embodiment comprises a cavity 1 defined by sidewalls such as 6, ceiling 2, rear wall 3, floor 4 and a door 5, all formed of metallic material. This particular cavity has dimensions of 10 inches cube. The door 5 is normally locked shut in operation to minimise leakage of radiation. A magnetron 9 is coupled to stub antenna 10 to launch electromagnetic microwave energy into a waveguide launching section 8 in a basic mode such as TE10. The frequency of the microwave energy can suitably be 2450 mc./s., for instance. In the simple arrangement shown by way of example, the waveguide 8 is coupled to the oven chamber through a single slot 7 in the ceiling 2 of the chamber, although other arrangements may be used. A shelf 11 is provided in the cavity 1, for supporting an article 12 in a position to receive radiation from the slot 7. The article may be a snack or meal in a dish 13. The shelf 11 may incorporate a turntable arrangement (not shown) for rotating the article during heating to improve the uniformity of heating.

Microwave radiations through the open door would constitute a health hazard. Also, the impedance of the oven chamber depends on whether an article to be heated is present in the chamber, and whether the oven door is open; if the impedance of the chamber is not matched to the waveguide and the magnetron, the magnetron might be damaged by power reflected back along the waveguide. In this embodiment of the invention, the acoustic detection device is arranged to prevent operation of the magnetron 9 if there is no article to be heated in the oven chamber, or an inappropriate article, and if the oven door is open.

The detection device comprises a moving coil transmitter 14 and a carbon granule receiver 15 which are both mounted on the outside of the rear wall 3 of the oven chamber. The receiver 15 is mounted on a resilient pad 16 and provided with a sound-proof housing 17 to reduce direct acoustic coupling between the transmitter and receiver through the walls of the chamber. Perforations 18 and 19 are provided in the rear wall of the oven chamber to couple the transmitter and receiver respectively to the oven chamber, while attenuating the electromagnetic radiation.

Referring now to FIGURE 2, the receiver 15 is connected to the input of a wide-band high-gain amplifier 20, and the output of the amplifier is connected to the transmitter 14 through an impedance matching transformer 21 to the transmitter 14. In operation, the circuit oscillates at a frequency determined by the acoustic characteristics of the oven chamber, at which the feedback is regenerative. If the Q-factor of the acoustic path through the chamber is high, compared with the Q-factor of the other elements of the oscillator, the circuit will oscillate at a frequency determined by the resonance frequency of the cavity which in this example is of the order of 30 kc./s. Removing an article from the oven, or merely opening the oven door substantially changes the oscillation frequency. To detect such a change, a bandpass filter 22 turned to the normal oscilaltion frequency is connected to the output of transformer 21, the signal passed by the filter is rectified and used to control a relay 23. An attenuator 24 is set to a point where the feedback is only just sufficient to cause oscillation. The relay 23 may be connected in series with the high tension supply to the magnetron, so that the magnetron is only energised with an article to be heated present in the oven chamber, and the door closed.

Figure 3:
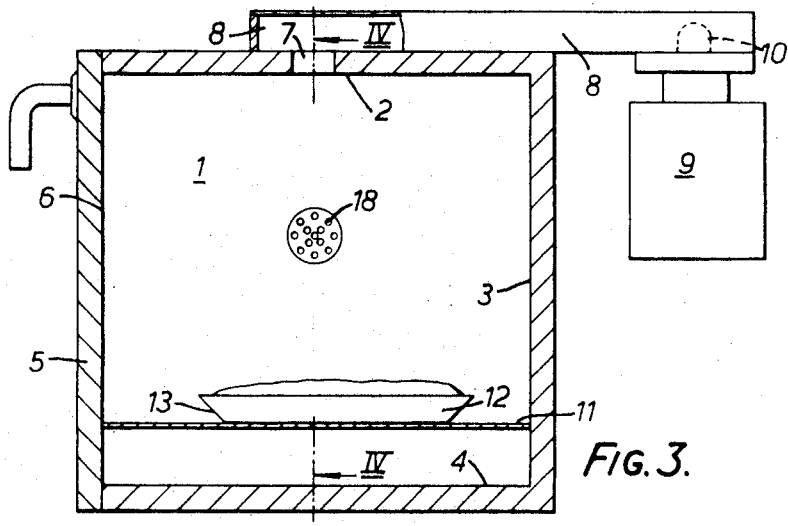
FIGURE 3 is a schematic sectional view of a microwave oven which incorporates detection apparatus for monitoring the presence of vapours emitted by heated articles in the oven.
Figure 4:
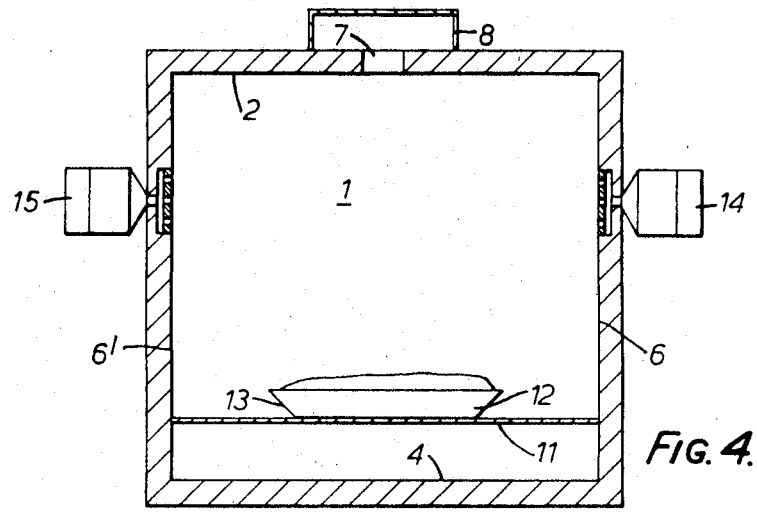
FIGURE 4 is a schematic sectional view from the line IV—IV in FIGURE 3.

In another embodiment of the invention, the microwave oven, shown in FIGURES 3 and 4, is generally similar to the oven of FIGURE 1. However, the acoustic detection device in this embodiment is used to detect the presence of steam and other vapours which may be emitted when an article of food is heated. Mechanical microswitch arrangements may be used to detect whether an article of food is present in the oven chamber, and whether the oven door is closed.

The transmitter 14 and receiver 15 are mounted on the outside of the sidewalls 6 and 6' of the oven chamber, in this embodiment, and are preferably piezoelectric transducers, such as barium titanate crystals fitted into tapered tubes which reduce the beam width of the acoustic radiation. The transducers are positioned facing each other, on opposite walls of the chamber.

Figure 5:
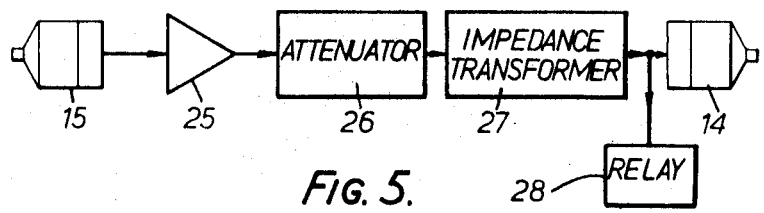
FIGURE 5 is a circuit diagram of the detection apparatus used with oven of FIGURE 3.

Referring to FIGURE 5, the receiver 15 is connected to the input of an amplifier 25, and the transmitter 14 is connected to the output of the amplifier through an attenuator 26 and impedance matching transformer 27. The circuit is arranged just to oscillate if the acoustic path between transmitter 14 and receiver 15 does not attenuate the acoustic signal appreciably, by adjusting the attenuator 26. Since the transducer crystals have a very high Q-factor, the frequency of oscillation is determined principally by the resonance of these crystals, and may be 45 kc./s., for instance. The presence of appreciable quantities of steam or other vapours in the acoustic path between the transmitter 14 and receiver 15 stops the circuit oscillating. The output signal from the amplifier controls a relay 28.

The production of steam by an article of food is largely dependent on the temperature it has reached, and the detection device of this embodiment is used to give an indication that the article has reached a given temperature, and switch off the magnetron 9 automatically. For this purpose the relay 28 is connected in series with the high tension supply to the magnetron, to interrupt the supply when the detection circuit stops oscillating.

I claim:
1. Heating apparatus comprising a heating chamber adapted to receive an article to be heated, a source of heating energy for heating an article in said chamber, detection apparatus responsive to the presence of matter in said chamber, said detection apparatus including an oscillator sensitive to the acoustic characteristics of said chamber, said oscillator including an amplifier element having an input and an output, an acoustic transmitter coupled acoustically to said chamber and connected electrically with the output of said amplifier element for energization thereby to radiate an acoustic signal into said chamber, and an acoustic receiver coupled acoustically to said chamber and connected electrically with the input of said amplifier element for responding to said acoustic signal to provide a regenerative feedback signal for said amplifier element, and output means electrically connected with said amplifier for disabling said source of heating energy in response to the occurrence of a predetermined acoustic signal within said chamber.

2. Heating apparatus according to claim 1, wherein said source is a source of radio frequency electromagnetic radiation and wherein said chamber has electrically conductive walls, said transmitter and said receiver being coupled to said chamber through apertures in said walls which attenuate the propagation of said radiation therethrough.

3. Heating apparatus according to claim 1, wherein said detection apparatus includes attenuator means for adjusting the amplitude of said regenerative feedback so that said oscillator oscillates under only some acoustical conditions in said chamber, said output means being responsive to the presence of oscillation.

4. Heating apparatus according to claim 3, wherein said output means includes a high tension supply for said source, and relay means connected to said high tension supply responsive to said oscillation to control the supply of said high tension to said source.

5. Heating apparatus according to claim 1, wherein the Q-factor of said chamber is substantially higher than the Q-factors of the other elements of said oscillator, said detection apparatus including attenuator means for adjusting the amplitude of said regenerative feedback, whereby said oscillator normally oscillates at a frequency which is a function of the acoustic resonance frequency of said chamber, said output means being responsive to said frequency.

6. Heating apparatus according to claim 5, wherein said output means includes filter means for producing an output signal whose amplitude is a function of said frequency.

7. Heating apparatus according to claim 5, wherein said output means includes a high tension supply for said source, and relay means connected to said high tension supply and responsive to said frequency to control the supply of said high tension to said source.

References Cited
UNITED STATES PATENTS

| | | |
|---|---|---|
| 2,071,933 | 2/1937 | Meissner. |
| 2,197,028 | 4/1940 | Wolff. |
| 3,281,567 | 10/1966 | Meissner et al. _____ 219—10.55 |

JOSEPH V. TRUHE, Primary Examiner

L. H. BENDER, Assistant Examiner

U.S. Cl. X.R.
340—258